UNITED STATES PATENT OFFICE.

LOUIS LUCAS, OF JAMESTOWN, NEW YORK.

PINE-INCENSE AND PROCESS OF MAKING SAME.

1,216,710.      Specification of Letters Patent.      Patented Feb. 20, 1917.

No Drawing.      Application filed October 13, 1916. Serial No. 125,382.

*To all whom it may concern:*

Be it known that I, LOUIS LUCAS, a citizen of the United States, residing at the city of Jamestown, in the county of Chautauqua and State of New York, have invented certain new and useful Improvements in Pine-Incense and Processes of Making Same, of which the following is a specification.

The invention relates to a pine incense and the process of combining some of the aromatic elements of coniferous or, as commonly known, evergreen trees with a combustible element to provide an incense which exhales the aromatic odor of the conifer or evergreen during combustion, and particularly of the pine and balsam fir, though nearly all the coniferous trees including the pine, larch, spruce, hemlock, fir, cypress, *Sequoia*, cedar, arbor vitæ, juniper, yew, and gingko provide the aromatic elements necessary for this incense in a greater or lesser degree.

There are many aromatic portions of the coniferous trees such as the resinous exudation from the wood or the wood itself, the cones, or the tips of the branches, but the needles are preferred since they give forth more truly the peculiarly delicate and attractive aroma of the *Pinaceæ* in the forest. They are also more readily prepared as incense.

In preparing pine incense, the branches are first cut from the trees and preferably air dried, that is, without artificial heat. The dry aromatic needle-shaped leaves are then easily stripped from the branches and powdered, preferably by grinding and sifting to a fine flour.

In order to render this needle powder or flour freely and rightly combustible for incense, it is mixed with a combustible element preferably powdered charcoal in varying quantities according to the strength of the aromatic odor desired; thus the proportions may be varied from equal parts needle flour and powdered charcoal to seven-eighths needle flour and one-eighth powdered charcoal. The strength usually preferred however is about two-thirds needle flour and one-third powdered charcoal, which also gives about the right burning qualities.

In order to retain the aromatic strength of said needle flour so that it will not deteriorate perceptibly, the well mixed charcoal and needle flour are changed to a stiff paste by the addition of a binding or sealing element, preferably a coniferous extract as, for example, a solution of balsam Tolu consisting of one-third balsam Tolu cut in two-thirds alcohol, preferably wood alcohol, though other coniferous gum extracts might be used. This paste is then dried in an oven to thoroughly evaporate the alcohol. After being thoroughly dried it is again powdered to a fine flour and may be used in the powdered form as an incense, burning with a light ash and exhaling or releasing the odor of the pine. It is usually preferred, however, in the stick form for burning in a suitable holder.

In making the sticks the incense powder, prepared as hereinbefore described, is mixed with a solution of gum tragacanth, preferably about one part gum tragacanth to sixteen parts water. Sufficient of the incense powder is mixed with this gum tragacanth binder to form a stiff paste, which is forced through tubes by suitable mechanism thereby forming sticks the size and shape of said tubes, care being taken to provide supporting means for receiving the soft paste stick forms and holding them separate from one another and in straight line so that they may be dried in an oven or in any other suitable manner.

It is apparent that the pine incense paste with the gum binder may be formed into other convenient shapes for burning and that the size and shape of the sticks may be varied by varying the size and shape of the tubes. The dried sticks have simply to be ignited filling an apartment with the odor of the pine as combustion takes place.

The full strength of the aromatic coniferous needle flour, without the charcoal, may be obtained by saturating the needle flour with a combustible solution, as for example, potassium nitrate, which saturated needle flour, after drying, burns freely but is too strong and pungent to be agreeable; accordingly charcoal is preferred as a cheaper and more readily applied combustible element, and one which is also odorless and smokeless. The gum tragacanth also has little or no smoke or odor.

I claim as new:

1. A pine incense comprising finely divided sifted needles of the *Pinaceæ*, powdered charcoal, and a combustible sealing element.

2. An incense comprising a needle flour of the *Pinaceæ* combined with powdered charcoal.

3. An incense comprising, in its entirety, a flour made from the dried needles of the *Pinaceæ*, a combustible element commingled therewith, and a combustible sealing element uniting the two.

4. The process of making incense from coniferous trees which comprises grinding and sifting the dried needles from coniferous trees to form needle flour, and mixing powdered charcoal with said needle flour in the desired portions to render it combustible.

5. The process of making pine incense which comprises drying the needles of the *Pinaceæ*, grinding and sifting the dried needles to form needle flour, mixing powdered charcoal with said needle flour to render it combustible, and mixing said mixed needle flour and charcoal with a combustible sealing element to retain the aromatic strength of said flour.

6. The process of making pine incense which comprises drying the needles of the *Pinaceæ*, grinding and sifting said dried needles to form needle flour, and mixing said flour with an alcohol solution of balsam Tolu, and again powdering said mixture after evaporating the alcohol therefrom.

7. The process of making pine incense which comprises drying the needles of the *Pinaceæ*, grinding and sifting said dried needles to form needle flour, mixing powdered charcoal with said needle flour to render it combustible, mixing said flour with a combustible sealing element to retain the aromatic strength of said flour, powdering said mixture after sealing, mixing this powder with a gum solution as a binder, and drying to hold the mixture in a desired form for burning.

8. The process of making pine incense which comprises drying the needles of the *Pinaceæ*, grinding and sifting said dried needles to form needle flour, mixing said flour with an alcohol solution of balsam Tolu, then powdering this mixture after evaporating the alcohol therefrom, then mixing the powder so obtained with a solution of gum tragacanth and forming this mixture into sticks while soft and drying in a suitable oven.

9. The process of making pine incense which comprises reducing the previously dried needles of the *Pinaceæ*, mixing a combustible element therewith, and adding a combustible sealing element to the mixture.

10. The process of making pine incense which comprises reducing the needles of the *Pinaceæ*, mixing a combustible element therewith, adding a combustible sealing element to the mixture to retain the aroma of the needles, and powdering the mixture.

11. The process of making pine incense which comprises drying the pine needles of the *Pinaceæ*, grinding and sifting the dried needles to form needle flour, mixing powdered charcoal with said needle flour to render it combustible, mixing said mixed needle flour and charcoal with a combustible sealing element to retain the aromatic strength of said flour, and powdering the mixture.

In testimony whereof I have affixed my signature in the presence of two witnesses.

LOUIS LUCAS.

Witnesses:
H. A. SANDBERG,
I. E. NORDSTROM.